US010591717B2

(12) United States Patent
Moser et al.

(10) Patent No.: US 10,591,717 B2
(45) Date of Patent: Mar. 17, 2020

(54) LIGHT MODULE FOR EMITTING LIGHT AND METHOD FOR EMITTING VISIBLE AND NON-VISIBLE LIGHT

(71) Applicant: FISBA AG, St. Gallen (CH)

(72) Inventors: Hansruedi Moser, Hinterforst (CH); Patrick Spring, Goldach (CH); Marcel Wäspi, Häggenschwil (CH)

(73) Assignee: FISBA AG, St. Gallen (CH)

( * ) Notice: Subject to any disclaimer, the term of this patent is extended or adjusted under 35 U.S.C. 154(b) by 0 days.

(21) Appl. No.: 16/084,584

(22) PCT Filed: Feb. 28, 2017

(86) PCT No.: PCT/EP2017/054599
§ 371 (c)(1),
(2) Date: Sep. 13, 2018

(87) PCT Pub. No.: WO2017/174261
PCT Pub. Date: Oct. 12, 2017

(65) Prior Publication Data
US 2019/0079283 A1 Mar. 14, 2019

(30) Foreign Application Priority Data

Apr. 6, 2016 (EP) .................................. 16163978

(51) Int. Cl.
*G03B 21/14* (2006.01)
*H04N 9/31* (2006.01)
(Continued)

(52) U.S. Cl.
CPC ......... *G02B 26/101* (2013.01); *G03B 21/142* (2013.01); *G03B 21/20* (2013.01);
(Continued)

(58) Field of Classification Search
CPC ...... H04N 9/31; H04N 9/3129; H04N 9/3152; H04N 9/3161; H04N 9/3194;
(Continued)

(56) References Cited

U.S. PATENT DOCUMENTS 6,670,603 B2 * 12/2003 Shimada ................... G01J 1/32
250/235
7,144,117 B2 12/2006 Kojima
(Continued)

FOREIGN PATENT DOCUMENTS

| EP | 2 709 366 A2 | 3/2014 |
|---|---|---|
| EP | 2 785 059 A1 | 10/2014 |
| WO | 2009/031094 A1 | 3/2009 |

OTHER PUBLICATIONS

International Search Report Corresponding to PCT/EP2017/054599 dated May 12, 2017.
(Continued)

*Primary Examiner* — William C. Dowling
(74) *Attorney, Agent, or Firm* — Davis & Bujold PLLC; Michael J. Bujold

(57) ABSTRACT

A light module (1) which comprises preferably at least three laser diodes (2a, 2b, 2c) that emit light in a visible wavelength range, a respective collimating device (3a, 3b, 3c) per laser diode, a beam combination device (4) for combining the emitted light of the individual laser diodes (2a, 2b, 2c), a beam-shaping device (5) for shaping the combined beam, and at least one emitter (6) for generating non-visible light, in particular an IR laser diode. The emitter (6) is arranged in such a way that the emitted non-visible light is not guided through at least one of the beam combination device (4) or the beam-shaping device (5).

32 Claims, 4 Drawing Sheets

(51) Int. Cl.
*G02B 26/10* (2006.01)
*G03B 21/20* (2006.01)
*G03B 21/53* (2006.01)

(52) U.S. Cl.
CPC ....... *G03B 21/206* (2013.01); *G03B 21/2033* (2013.01); *H04N 9/3129* (2013.01); *H04N 9/3161* (2013.01); *H04N 9/3164* (2013.01); *H04N 9/3194* (2013.01); *G03B 21/53* (2013.01)

(58) Field of Classification Search
CPC .... H04N 9/3164; G03B 21/14; G03B 21/204; G03B 21/208; G03B 21/2013; G03B 21/2066

See application file for complete search history.

(56) References Cited

U.S. PATENT DOCUMENTS

| | | | | |
|---|---|---|---|---|
| 8,182,093 B2 * | 5/2012 | Kurozuka | ............ | H04N 9/3129 353/37 |
| 9,521,382 B2 * | 12/2016 | Lee | ............ | G06F 3/1423 |
| 2012/0293775 A1 * | 11/2012 | Kita | ............ | G02B 26/101 353/38 |
| 2014/0293231 A1 * | 10/2014 | Yoon | ............ | G03B 21/142 353/20 |

OTHER PUBLICATIONS

Written Opinion Corresponding to PCT/EP2017/054599 dated May 12, 2017.

\* cited by examiner

LIGHT MODULE FOR EMITTING LIGHT AND METHOD FOR EMITTING VISIBLE AND NON-VISIBLE LIGHT

The invention concerns a light module, a projection module, a method for emitting visible and non-visible light and a method for producing a light module according to the generic terms of the independent claims.

Light modules are already known in which light of different wavelengths is combined in one beam and then directed onto a projection screen.

From WO 2009/031094 and U.S. Pat. No. 7,144,117, for example, projection modules are known which direct the collimated light of three laser diodes in the red, green and blue wavelength range onto dielectric mirrors, combining the light into one beam. The dielectric mirrors reflect the light with the wavelengths of the laser diodes assigned to them and are transparent to the other wavelengths.

The combined beam is guided to a two-dimensional scanning unit, which comprises at least one scanner mirror and then directs the light beam onto a projection surface.

The projection module also includes an infrared light source that emits non-visible light, which is coupled into the combined laser beam with another dielectric mirror and scans the projection surface together with the visible light.

The infrared light can be used to detect the distance of the projection surface or an irregularity in the absorption properties. This allows obstacles, unwanted or endangered objects, for example persons who could be endangered by the laser radiation, to be detected in the beam path.

The infrared light can be projected together with the laser beam or run ahead of the laser beam. For this purpose, the infrared light can either be guided via a separate scanner unit or guided at a different angle onto a scanner mirror than the laser beam.

The projection module includes an infrared sensor that detects reflected infrared light. If an irregularity is detected which indicates, for example, the presence of a person who could be endangered by the laser beam, in particular a sensitive eye, the working current of the laser diodes and thus the intensity of the laser beam following the infrared beam can be reduced until the reflected infrared light returns to normal levels.

In order to enable clear and sharp projection images, especially with miniaturized light modules, a beam shaping device is usually provided which forms the beam emitted by the laser diodes. An asymmetrical beam profile, for example with an oval cross-section and/or with unequal fast and slow axes of the beam, can be formed into a substantially symmetrical beam profile, for example with a substantially round cross-section.

One beam shaping device can be provided per laser diode, but preferably only one beam shaping device is provided for the combined beam.

A prism telescope can be provided as a beam shaping device, in which a laser beam with an elliptical cross-section, as it typically leaves a collimating device, is transformed by a pair of prisms into a beam with a substantially round cross-section.

It is the task of the invention to create a light module, a projection module and a method for emitting visible and invisible light, which allow convenient operation and which can be made available at low cost.

The task is solved by a light module for emitting light which comprises at least one, preferably at least three laser diodes emitting light in a visible wavelength range, the laser diodes preferably being placed in a diode holder, in particular pressed-in.

By means of the diode holder, the laser diodes can be easily mounted in the light module, especially in one step in a housing, if all diodes are placed in a common diode holder. A compact design is achieved, as well as short cables to the control electronics. In this way, light modules can be produced cost-effectively.

The light module comprises a collimating device per laser diode and a beam combination device to combine the emitted light of the individual laser diodes. Dichroic mirrors which reflect certain wavelengths and are transparent to the other wavelengths can be used as beam combination devices.

One dichroic mirror per laser diode is preferred. The laser diodes can then be arranged side by side so that they emit approximately parallel laser beams.

The light module comprises a beam shaping device for shaping the merged beam or one beam shaping device per laser diode.

The light module also comprises at least one, preferably exactly one, emitter for generating non-visible light, in particular an IR laser diode for generating infrared light.

Several IR laser diodes, which emit light with different wavelengths, for example, can be provided.

According to the invention, the emitter is arranged in such a way that the emitted non-visible light is not guided through the beam combination device and/or not through the beam shaping device.

It turned out that for most applications the non-visible light does not have to be shaped as precisely as the visible light. Non-visible light can nevertheless be reflected and detected with sufficient accuracy to extract the desired information.

During installation, there is no need to adjust the emitter for non-visible light in relation to a beam shaping device. In addition, the beam shaping device does not have to be designed to form non-visible light. For example, it can be less complex to coat if the wavelength range does not include the infrared range. When using a prism telescope, the steep angles of incidence are already a challenge for the red/green/blue range. A further widening would increase the requirement extremely.

Installation is facilitated by the inventive arrangement and the lighting module can be made available at a lower cost.

Preferably, the non-visible light is coupled in the direction of the beam path after a beam shaping device to form the merged beam in the area of the merged beam.

The non-visible light may be guided along the optical axis of the merged beam, slightly offset thereto or at an angle to the optical axis of the merged beam, depending on whether the non-visible light is to be transmitted together with the visible light via a scanning device, offset to the visible light via the same scanning device or via a separate scanning device.

In an advantageous design of the invention, a filter is provided via which the invisible light can be coupled into the region of the merged beam of the laser diodes, whereby the filter is preferably arranged in the direction of the beam path after the beam shaping device for shaping the merged beam.

The light module preferably has a collimating device that collimates the invisible light before it is coupled to the visible light, especially before it passes over the filter.

In an advantageous design, the laser diodes are arranged next to each other so that the light emerging from the respective laser diode is essentially parallel to the light emerging from the adjacent laser diode.

This arrangement allows easy mounting, which is particularly advantageous for miniaturized projection modules.

A particularly simple design and thus also the possibility of rapid mounting results if the at least one emitter, in particular the IR laser diode, is arranged next to one of the laser diodes, the light emerging from the emitter being aligned essentially parallel to the emerging light from the adjacent laser diode.

Laser diodes and IR laser diode can be mounted on a common diode holder so that all laser diodes can be placed in one housing in one step. Furthermore, short cable routes are only possible if this is the case.

The task is also solved by a projection module that includes a light module as described above. In an advantageous design of the invention, the projection module comprises a scanning device, in particular a MEMS mirror, so that at least the visible light from the laser diodes is deflectable by the scanning device, preferably also the invisible light.

The projection module can be provided in a very compact design.

In another advantageous version of the invention, the projection module has a detector for non-visible light, in particular an IR detector, with which reflected non-visible light, in particular IR light, can be detected.

The detector can be arranged in the light module and be used for power control of the IR laser diode.

The detector preferably comprises an evaluation unit or is connectable to an evaluation unit, which makes the detected non-visible light evaluable. The detector can be used to determine whether there are fluctuations in the reflected signal. For example, it can be determined whether there is a moving object or an object with special absorption properties in the projection room.

The combination of an ingenious light module, an IR laser diode and an IR sensor allows the production of a miniaturized projection module with convenient operating options.

For example, the projection module includes a control unit or is connectable to a control unit, which controls the laser diodes and preferably a scanning device and especially preferably the emitter.

Depending on the information obtained about the non-visible light, the projection module, in particular the light module, can react via the control unit, e.g. reduce the intensity of the laser diodes, move the projection screen, display additional images or other. Furthermore, gesture recognition is possible.

The task underlying the invention is also solved by a process for emitting visible and invisible light with a light module, in particular as described above, with the following process steps.

Visible light is emitted from laser diodes. In particular, visible light in the red, blue and green wavelength ranges is emitted by the respective laser diodes.

The emitted visible light of the respective laser diodes is collimated, while the emitted light passes through collimating devices, which are assigned to the laser diodes in particular.

The emitted visible light is combined in a beam combination device to form a common beam. For this purpose, the emitted light passes through dichroic filters in particular.

The emitted visible light of the respective laser diodes or the combined light is formed in a beam shaping device. A prism telescope in particular serves as a beam shaping device. In particular, a light beam with an elliptical cross-section is formed into a light beam with an essentially round cross-section.

Furthermore, non-visible light is emitted from at least one emitter, especially infrared light from an IR laser diode, and the non-visible light is emitted from the light module.

In particular, the visible and non-visible light is emitted from the light module together.

According to the invention, the invisible light is not guided through the beam combination device and/or not through the beam shaping device.

In particular, to form the merged beam the non-visible light is coupled in the area of the merged beam after a beam shaping device in the direction of the beam path. For this purpose, the non-visible light is preferably passed through a filter which is transparent to the visible light and which deflects the non-visible light in the direction of the beam path of the visible light.

Preferably, the non-visible light is also collimated. For this purpose, the light emitted from the emitter passes through a collimating device assigned to the emitter.

The laser diodes for visible light preferably emit light in the red wavelength range with wavelengths from 638 nm to 650 nm, in the green wavelength range at about 520 nm and in the blue wavelength range at about 450 nm.

The emitter for non-visible light preferentially emits infrared light at about 830 nm, but in principle light from a wavelength range between 800 and 1600 nm can be used.

In an advantageous version of the method, the reflected non-visible light, especially IR light, is detected by a detector. In particular, the detector is arranged in the light module and is used, for example, for power control of the IR laser diode.

Alternatively or additionally a detector is arranged in the projection module and not in the light module.

The method can be used to detect movement or objects in a projection room. In a further step, the signal from the detector is preferably processed in an evaluation unit.

In an advantageous advanced training of the invention, the laser diodes, the emitters, in particular an IR laser diode, and/or a scanning device, in particular a MEMS mirror, are controlled by a control unit. In particular, the detector signal can form the basis for control. The laser diodes and/or the scanning device can therefore be switched depending on a reflected IR signal.

The task underlying the invention is also solved by a method of manufacturing a light module comprising the following steps.

At least one, preferably three, laser diodes emitting light in a visible wavelength range are placed in a diode holder, in particular pressed into it. In particular, the laser diodes are arranged next to each other and emit light emitted essentially parallel to each other.

The collimating devices are set in such a way that one collimating device is arranged in front of each laser diode.

Dichroic mirrors for the combination of the emitted, visible light are set, so that in particular one dichroic mirror per laser diode is present.

A beam shaping device, preferably a prism telescope, is used to form the combined visible beam.

A non-visible light emitter, in particular an IR laser diode, is placed in a diode holder, in particular press-fitted, preferably into the same diode holder in which the visible light laser diodes are placed.

In particular, the non-visible light emitter is placed at a position next to the laser diodes so that the emitters also emit substantially light that is emitted parallel to the visible light.

In addition, a filter for combining visible and non-visible light is set so that the non-visible light is only combined with the combined light of the visible laser diodes after the beam combination device.

The process steps can be carried out in the above sequence or in another sequence.

For example, all diodes can first be placed in a diode holder, which is not attached to a carrier of the light module until the other components are mounted.

The diodes and filters can also be set first and then the collimating devices can be mounted.

The invention is explained in more detail in the following design examples. For this FIG. 1 shows a schematic representation of a first example of a light module a perspective view;

Figure 1:
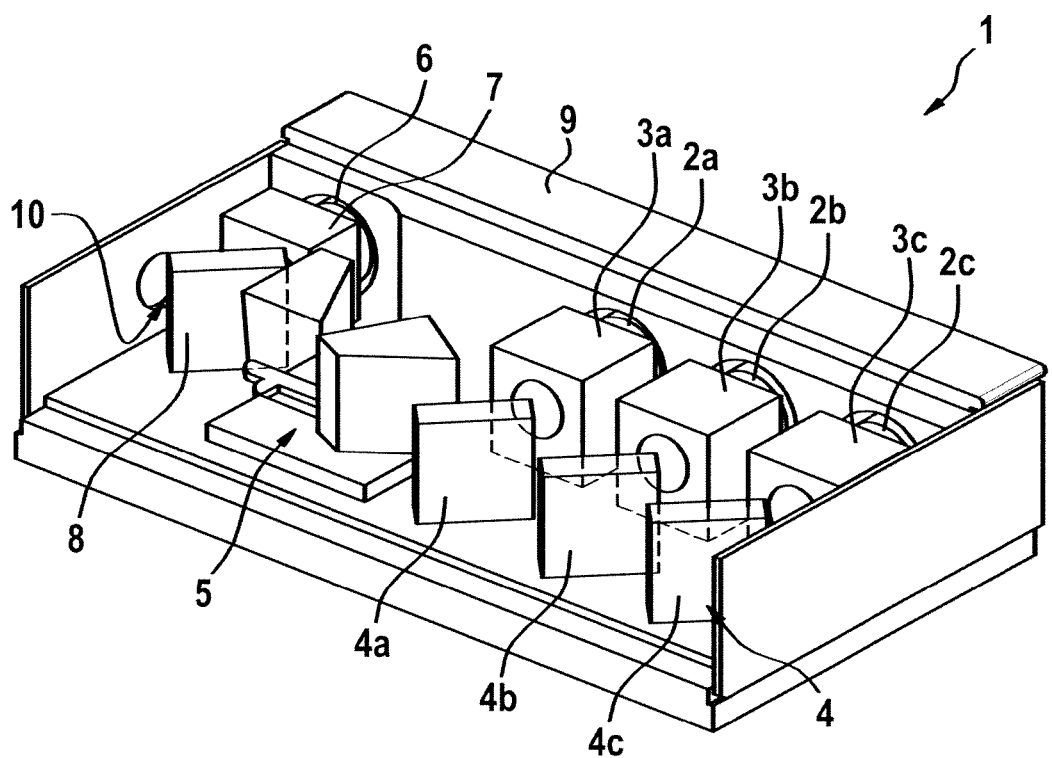
Figure 2:
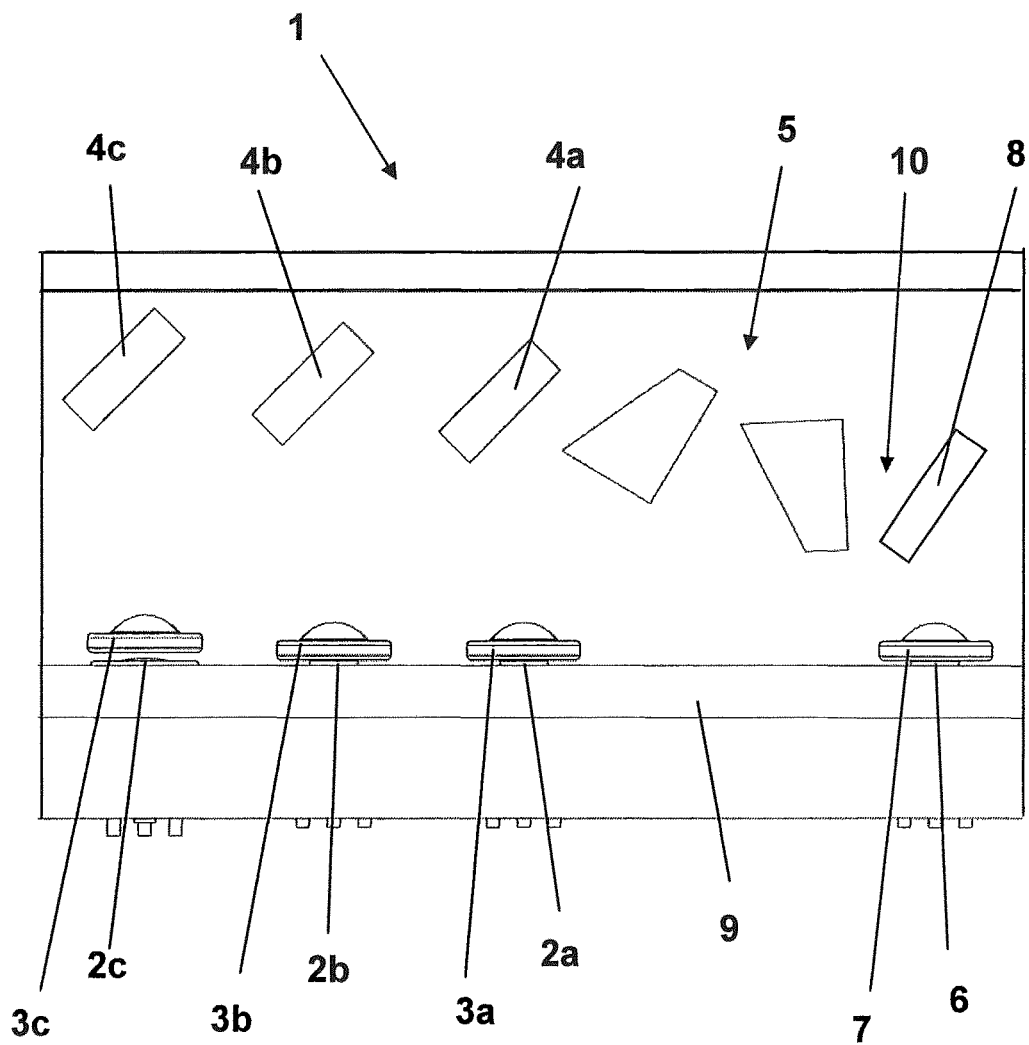
FIG. 2 shows a schematic representation of the first example of a light module in plan view.

FIG. 1 shows a schematic representation of a first example of a lighting module 1 in perspective view. FIG. 2 shows the same example in plan view. Light module 1 comprises three laser diodes 2a, 2b, 2c, which emit light in a visible wavelength range. The laser diodes 2a, 2b, 2c are arranged in a diode holder 9.

One collimating device 3a, 3b, 3c is provided per laser diode 2a, 2b, 2c.

Light module 1 comprises a beam combination device 4 for combining the emitted light of the individual laser diodes. In the design example shown, one dichroic mirror 4a, 4b, 4c per laser diode 2a, 2b, 2c is provided.

Light module 1 comprises a beam shaping device 5 for shaping the merged beam.

Light module 1 comprises an emitter for generating non-visible light 6, here an IR laser diode.

The emitter 6 is arranged in such a way that the emitted non-visible light is not guided through the beam combination device 4 and also not through the beam shaping device 5.

The IR light is collimated in a collimating device 7 and coupled by means of a filter 8 in the direction of the beam path after the beam shaping device 5 into the region 10 of the merged beam.

Figure 3:
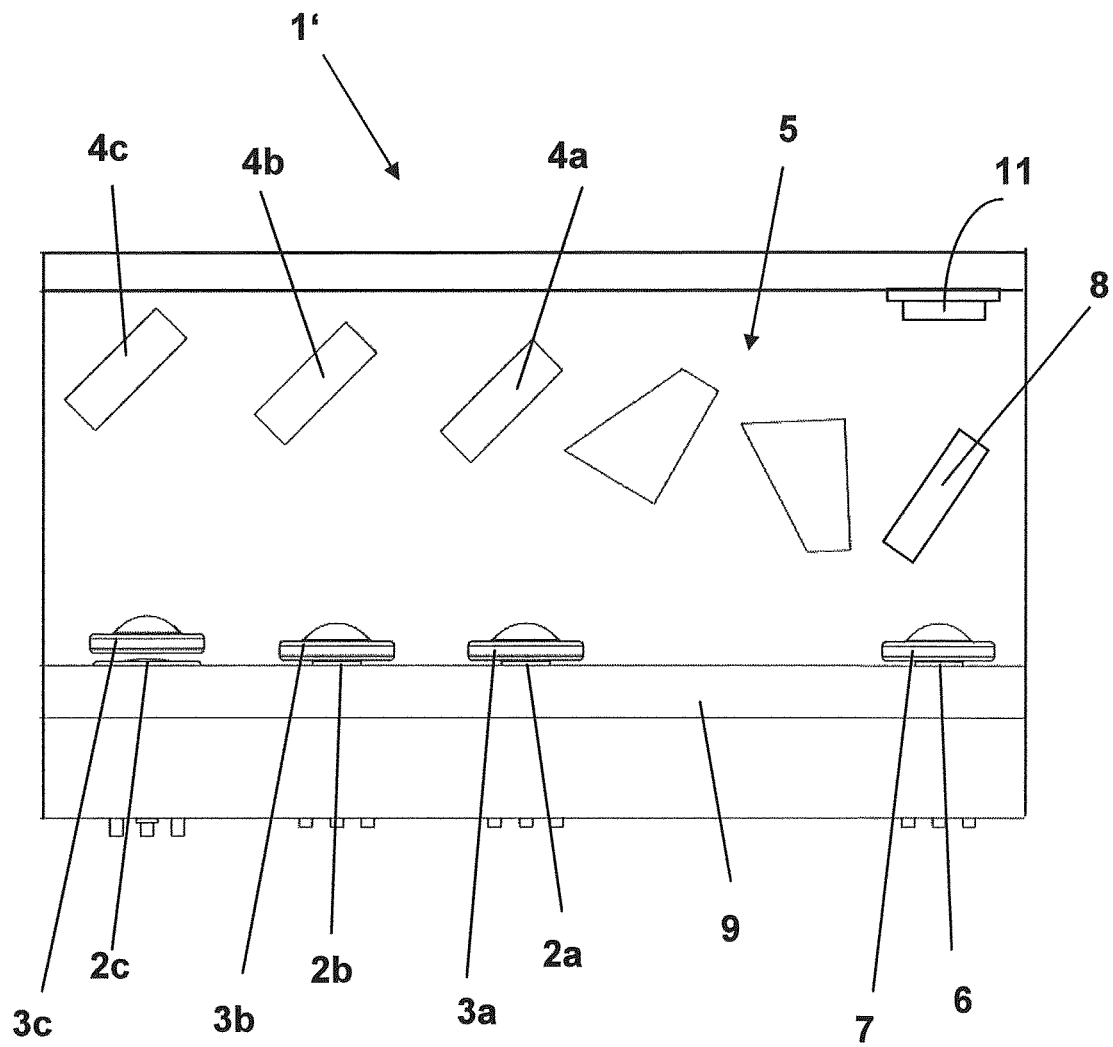
FIG. 3 shows a schematic representation of a second example of a light module in plan view.

FIG. 3 shows a light module 1' in which there is also an IR detector 11, which is acted upon by the back reflection of filter 8.

The measured signal can be used to control and/or regulate the diode power.

Figure 4:
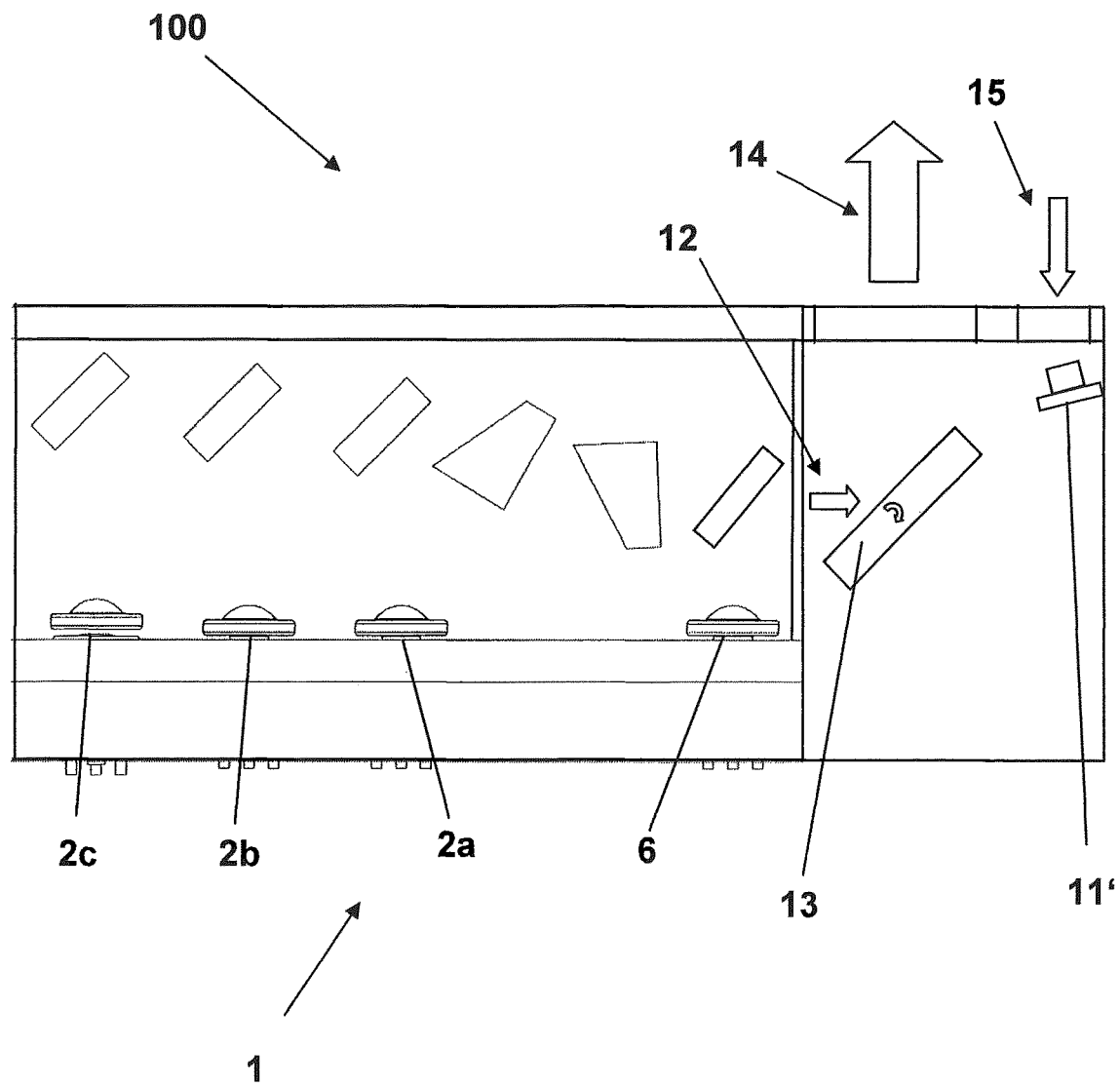
FIG. 4 shows a schematic representation of an example of a projection module in plan view.

FIG. 4 shows a schematic representation of an example of a projection module 100 in plan view. The projection module 100 comprises a light module 1 as shown in FIGS. 1 and 2.

The light 12 emitted from light module 1 meets a scanning device 13 in the form of a MEMS mirror and is scattered by it as projection light 14.

Back reflected IR light 15 hits an IR sensor 11'.

The laser diodes 2a, 2b, 2c, 6 and/or the scanning device 13 can be switched depending on the signal measured at the sensor 11'.

The invention claimed is:

1. A light module for emitting light comprising:
   at least one laser diode which emit light in a visible wavelength range,
   one collimating device per laser diode,
   a beam combination device for bringing together the emitted light of the individual laser diodes,
   a beam shaping device, in which a laser beam with an elliptical cross-section is transformed into a beam with a substantially round cross-section, for shaping a merged beam or one beam shaping device per laser diode, and
   at least one emitter for generating non-visible light,
   wherein the emitter is arranged such that the emitted non-visible light is at least one not guided through the beam combination device or not through the beam shaping device.

2. The light module according to claim 1, wherein the light module comprises at least three laser diodes.

3. The light module according to claim 1, wherein the laser diodes are arranged in a diode holder.

4. The light module according to claim 3, wherein laser diodes are pressed in a diode holder.

5. The light module according to claim 1, wherein the beam combination device comprises dichroic mirrors.

6. The light module according to claim 1, wherein the at least one emitter is an IR laser diode.

7. The light module according to claim 1, wherein the emitter is arranged such that the emitted non-visible light is coupled into a region of the merged beam in the direction of a beam path after a beam shaping device for shaping the merged beam.

8. The light module according to claim 1, wherein a filter is provided, which is transparent to the visible light and which deflects the non-visible light in the direction of the beam path of the visible light, via which the invisible light can be coupled into the region of the merged beam of the laser diodes and the filter is arranged in the direction of the beam path after the beam shaping device for shaping the merged beam.

9. The light module according to claim 1, wherein the laser diodes are arranged side by side so that light emerging from the respective laser diode is aligned substantially parallel to the emerging light from an adjacent laser diode.

10. The light module according to claim 1, wherein the emitter is arranged next to one of the laser diodes, and the light emerging from the emitter is aligned substantially parallel to the emerging light from an adjacent laser diode.

11. A projection module comprising a light module according to claim 1, wherein the projection module comprises a scanning device, so that at least the visible light from the laser diodes is deflectable by the scanning device.

12. The projection module according to claim 11, wherein the scanning device is a MEMS mirror.

13. The projection module according to claim 11, wherein also the invisible light of the emitter is deflectable by the scanning device.

14. The projection module according to claim 11, wherein the projection module comprises a detector for the non-visible light, with which reflected non-visible light can be detected.

15. The projection module according to claim 14, wherein the detector for the non-visible light is an IR detector.

16. The projection module according to claim 14, wherein the projection module comprises an evaluation unit, or can be connected to the evaluation unit, which makes the detected non-visible light evaluable.

17. The projection module according to claim 11, wherein the projection module comprises a control unit, or is connectable to the control unit, which controls at least one of the laser diodes, the scanning device and the emitter.

18. The light module according to claim 1, wherein the light module comprises a beam shaping device arranged for shaping a merged beam of visible light beams, and wherein the beam shaping device is a prism telescope and the emitter for generating non-visible light is arranged such that the emitted non-visible light is not guided through prism telescope.

19. A method for emitting visible and invisible light with a light module, the method comprising:
   emitting visible light from laser diodes,
   collimating the emitted visible light of the respective laser diodes,
   combining the emitted visible light in a beam combination device,
   shaping the emitted visible light of the respective laser diodes or the combined light in a beam shaping device, in which a laser beam with an elliptical cross-section is transformed into a beam with a substantially round cross-section,
   emitting non-visible light from an emitter,
   delivering the visible and the non-visible light from the light molecule without the non-visible light being guided through at least one of the beam combination device or the beam shaping device.

20. The method according to claim 19, further comprising shaping the emitted visible light of the respective laser diodes or the combined light in a prism telescope.

21. The method according to claim 19, further comprising emitting the non-visible light from an IR laser diode.

22. The method according to claim 19, further comprising jointly delivering the visible and non-visible light from the light module.

23. The method according to claim 19, further comprising coupling the non-visible light in a direction of the beam path after a beam shaping device for shaping the merged beam into the region of the merged beam.

24. The method according to claim 19, further comprising detecting the reflected non-visible light by a detector.

25. The method according to claim 24, further comprising arranging the detector in the light module.

26. The method according to claim 19, further comprising controlling at least one of the laser diodes, the emitter and a scanning device by a control unit.

27. A method of manufacturing a light module comprising:
   placing at least one laser diode into a diode holder which emit light in a visible wavelength range,
   placing one collimating device in front of each laser diode,
   setting one dichroic mirror per laser diode for combining the visible light emitted the individual laser diodes,
   positioning of a beam shaping device to shape the combined visible light, wherein a laser beam with an elliptical cross-section is transformed into a beam with a substantially round cross-section,
   placing an IR laser diode into a diode holder so that the IR laser diode emits IR light substantially parallel to the laser diode and the IR light is only combined with the combined light of the visible laser diodes after the beam combination device.

28. The method according to claim 27, further comprising pressing at least one of the at least one laser diode and the IR laser diode into the diode holder.

29. The method according to claim 27, further comprising placing at least three laser diodes into a diode holder.

30. The method according to claim 27, further comprising arranging the laser diodes next to one another and emitting light substantially parallel to one another.

31. The method according to claim 27, further comprising using a prism telescope as the beam shaping device.

32. The method according to claim 27, further comprising placing the IR laser diode at a position next to the laser diodes.

* * * * *